(12) United States Patent
Baig

(10) Patent No.: US 8,939,514 B2
(45) Date of Patent: Jan. 27, 2015

(54) LEG SUPPORT FOR VEHICLE OCCUPANT

(71) Applicant: Mohamed Ali Baig, Scarborough (CA)

(72) Inventor: Mohamed Ali Baig, Scarborough (CA)

( * ) Notice: Subject to any disclaimer, the term of this patent is extended or adjusted under 35 U.S.C. 154(b) by 40 days.

(21) Appl. No.: 13/758,333

(22) Filed: Feb. 4, 2013

(65) Prior Publication Data
US 2014/0217799 A1 Aug. 7, 2014

(51) Int. Cl.
A47C 7/50 (2006.01)
B60N 2/44 (2006.01)

(52) U.S. Cl.
CPC .................................. B60N 2/4495 (2013.01)
USPC .................................. 297/423.17; 297/423.19

(58) Field of Classification Search
USPC ............... 297/423.1, 423.11, 423.17, 423.19, 297/423.25
See application file for complete search history.

(56) References Cited

U.S. PATENT DOCUMENTS

| 2,133,443 | A |   | 10/1938 | Girl       |           |
|-----------|---|---|---------|------------|-----------|
| 2,491,009 | A | * | 12/1949 | Lawrence   | 297/411.23|
| 2,501,976 | A | * | 3/1950  | Vitek      | 297/344.18|
| 2,722,974 | A | * | 11/1955 | Stagner    | 297/423.17|
| 2,749,973 | A | * | 6/1956  | Leasy      | 297/423.17|
| 3,018,134 | A | * | 1/1962  | Shiplett et al. | 297/423.17|
| 3,106,425 | A | * | 10/1963 | McClintock | 297/423.17|
| 3,173,722 | A | * | 3/1965  | Carbonetti | 297/423.17|
| 3,236,561 | A | * | 2/1966  | Sedlock    | 297/423.17|
| 3,268,257 | A | * | 8/1966  | Delaney    | 297/423.17|
| 3,679,262 | A | * | 7/1972  | Slavitt    | 297/423.17|
| 3,942,818 | A |   | 3/1976  | Rohrman    |           |
| 4,131,298 | A |   | 12/1978 | Douglas    |           |
| 6,634,694 | B2| * | 10/2003 | Matsushita | 296/75    |

FOREIGN PATENT DOCUMENTS

DE          10228044 A1    3/2004

* cited by examiner

Primary Examiner — Philip Gabler
(74) Attorney, Agent, or Firm — Millman IP Inc.

(57) ABSTRACT

In an aspect, a leg support for a vehicle occupant is provided, and includes a leg support base and a leg engagement member. The leg support base is connected (or is connectable) to a center console of the vehicle. The leg engagement member may be integral with the leg support base or may be extendable from the leg support base. The leg engagement member is configured to engage the laterally outer face of a lower leg of a vehicle occupant. The leg engagement member has a leg engagement surface that has a lower edge and an upper edge. The lower edge is positioned to engage the lower leg of the vehicle occupant above the lateral malleolus of the fibula of the vehicle occupant. The upper edge is positioned to engage the lower leg of the vehicle occupant above a midpoint of the fibula and below the superior epiphysis of the fibula. The leg engagement member is positionable to support the lower leg of the vehicle occupant in such a way that the upper leg and the lower leg extend in a common plane that is substantially parallel to the sagittal plane of the vehicle occupant.

20 Claims, 12 Drawing Sheets

US 8,939,514 B2

LEG SUPPORT FOR VEHICLE OCCUPANT

FIELD

The disclosure generally relates to the art of leg supports for vehicle occupants.

BACKGROUND

It is known to provide leg supports for use by a vehicle driver that permit the occupant's leg to be supported while driving. Some proposed leg supports, however, suffer from several problems. Some are relatively complex structures that are also relatively expensive. Some are relatively ineffective at supporting the leg of the driver.

It would be advantageous to provide a leg support that at least partially overcomes one or more of the aforementioned problems.

SUMMARY

This section provides a general summary of the disclosure, and is not a comprehensive disclosure of its full scope or all of its features.

In an aspect, a leg support for a vehicle occupant is provided, and includes a leg support base and a leg engagement member. The leg support base is connected (or is connectable) to a center console of the vehicle. The leg engagement member may be integral with the leg support base or may be extendable from the leg support base. The leg engagement member is configured to engage the laterally outer face of a lower leg of a vehicle occupant. The leg engagement member has a leg engagement surface that has a lower edge and an upper edge. The lower edge is positioned to engage the lower leg of the vehicle occupant above the lateral malleolus of the fibula of the vehicle occupant. The upper edge is positioned to engage the lower leg of the vehicle occupant above a midpoint of the fibula and below the superior epiphysis of the fibula. The leg engagement member is positionable to support the lower leg of the vehicle occupant in such a way that the upper leg and the lower leg extend in a common plane that is substantially parallel to the sagittal plane of the vehicle occupant.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The foregoing and other aspects will be more readily appreciated having reference to the drawings, wherein.

DETAILED DESCRIPTION

Figure 1:
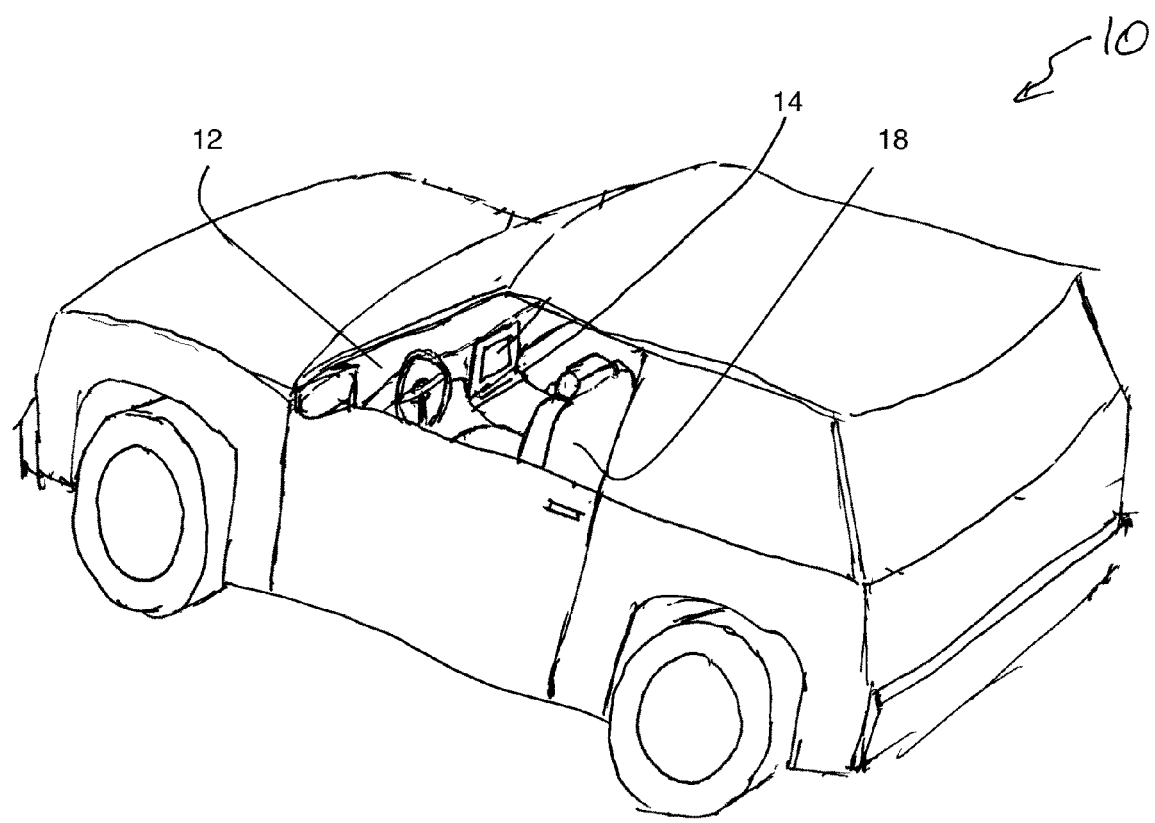
FIG. 1 is a perspective view of a vehicle.
Figure 2:
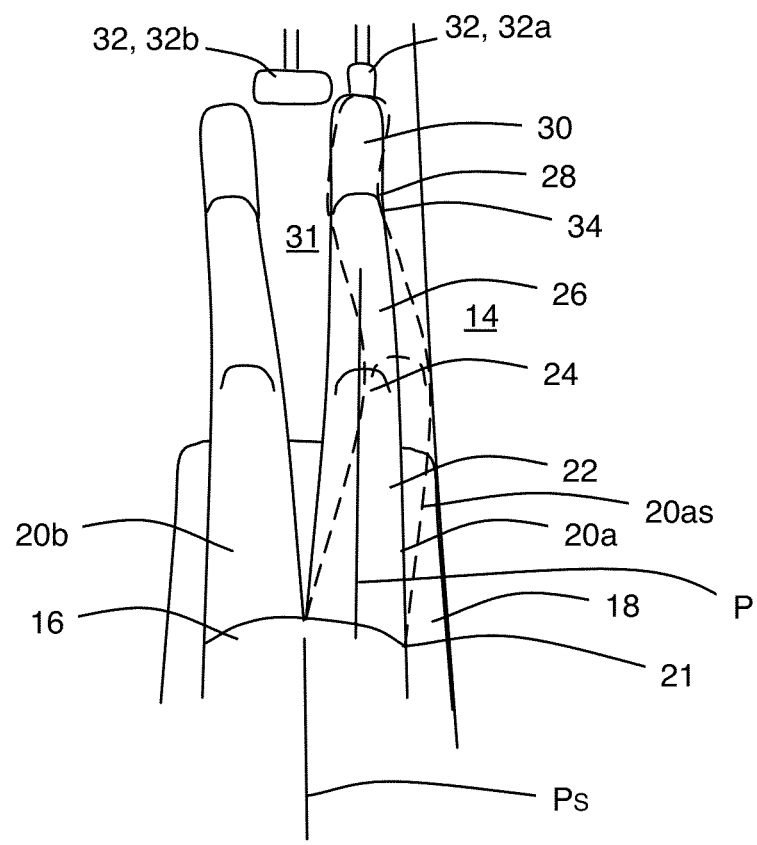
FIG. 2 is a plan view of a driver's portion of a passenger compartment of the vehicle shown in FIG. 1.

FIG. 1 is a perspective view of a vehicle 10 having a passenger compartment 12 and a center console 14 in the passenger compartment 12. Referring to FIG. 2, a vehicle driver 16 is shown sitting in the driver's seat, shown at 18. The driver 16 has two legs including an inboard leg 20a and an outboard leg 20b. The inboard leg 20a faces the center console 14. The inboard leg 20a is the right leg of the driver 16 on a left-hand drive vehicle, as shown, however it will be understood that the inboard leg 20a will be the left leg of the driver 16 on a right-hand drive car. Each leg 20 extends from a hip 21 and includes an upper leg 22, a knee 24, a lower leg 26, an ankle 28 and a foot 30.

Referring to FIG. 2, a plurality of pedals are shown at 32 and are provided within the driver's portion of the passenger compartment 12. The pedals 32 include an accelerator pedal 32a and a brake pedal 32b. Optionally, a clutch pedal is provided (not shown). In the vehicle 10 shown, the accelerator pedal 32a is nearer to the center console 14 and is thus the inboard pedal. In a case (not shown) where the vehicle 10 is a left hand drive vehicle the driver's inboard foot 30 may simply rest on a dead pedal on the vehicle floor shown at 31.

Referring to FIG. 2, in order to operate the accelerator and brake pedals 32a and 32b, the driver 16 may place the heel (shown at 34) of their foot 26 in one spot (e.g. in front of the accelerator pedal 32a) while rotating their foot 26 as needed to reach 32a and 32b. The position in which the heel 34 is placed may permit the lower leg 26 to be aligned with the upper leg 22 such that they extend in a common plane P that is substantially parallel to the sagittal plane of the driver 16, shown at $P_S$. Notwithstanding the presence of side bolsters on the driver's seat 18 in some vehicles 10, the driver 16 will need to exert some effort in order to hold their upper and lower legs 22 and 26 in the plane P and prevent the inboard leg 20a from splaying towards the center console under gravity, due to the lack of support on at least a portion of the upper leg 22 from the vehicle seat 18. After some time driving, the inboard leg 20a may fatigue from the effort and may undesirably splay towards the center console 14. The fatigue may be exacerbated by the repeated lifting and depressing of the driver's foot 30 and repeated rotation of the driver's ankle 28 to permit the foot 30 to switch which pedal 24 is being depressed.

The dashed outline shown at 20 as FIG. 2 is representative of the driver's inboard leg 20a splayed towards (and leaning against) the center console 14. As a result, the knee joint is bent at an angle that can cause strain to the knee 24 and also to other parts of the driver's body.

Figure 3:
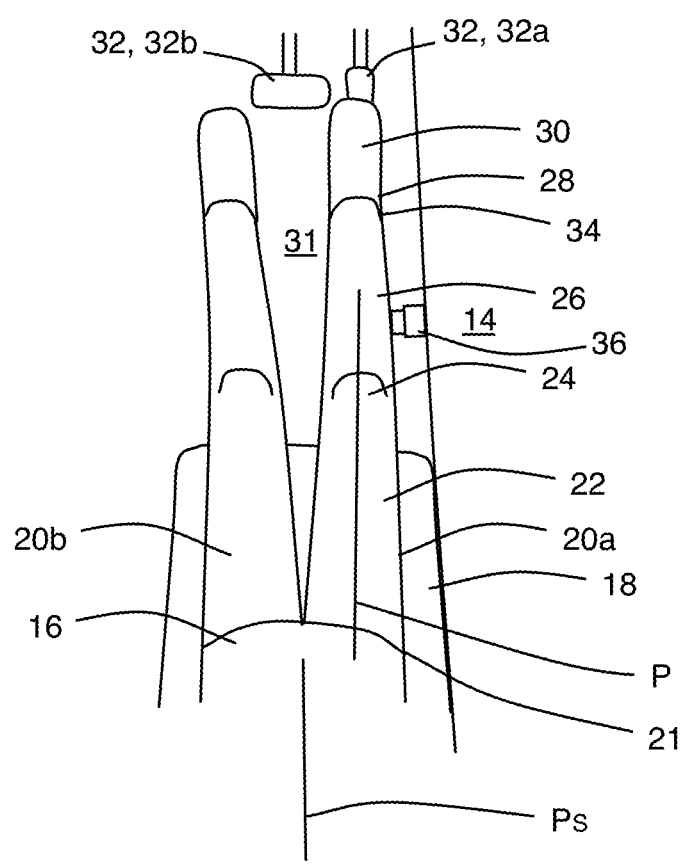
FIG. 3 is a plan view of the driver's portion of the passenger compartment shown in FIG. 2 showing a leg support supporting an inboard leg of a vehicle driver.

Referring to FIG. 3, a leg support 36 is provided and can hold the driver's inboard leg 20a so that the upper and lower legs 22 and 26 extend in the common plane P that is substantially parallel to the sagittal plane $P_S$ of the driver 16. The leg support 36 may have any suitable structure. For example the leg support 36 may include a leg support base 38 and a leg engagement member 40. The leg support base 38 may connect to the center console 14 of the vehicle 10 in any suitable way. For example, in an embodiment, the leg support base 38 may removably connect to the center console 14 by way of an adhesive, thereby permitting the leg support 36 to be purchased as an after-market item by the owner of the vehicle 10. In another embodiment, the leg support base 38 may be permanently connected to the center console 14, optionally being installed by the vehicle manufacturer during assembly of the vehicle 10 or as an aftermarket item. The leg support base 38 may be made from any suitable material, such as a suitable polymeric material.

In an embodiment, the leg support base 38 has a generally cylindrical inner surface 42, which slidingly receives a generally cylindrical outer surface 44 on the leg engagement member 40. The leg engagement member 40 may be extendable from the leg support base 38. For example, the leg engagement member 40 may extend telescopically from the leg support base 38. Any suitable locking mechanism may be provided for holding the leg engagement member 40 at a selected position in the leg support base 38. For example, a locking pin (not shown) may extend through apertures (not shown) in the leg support base 38 and the leg engagement member 40 that are aligned with one another.

Instead of a locking pin and a plurality of apertures to provide adjustability in the position of the leg engagement member 40, the leg engagement member may have a threaded connection with the leg support base 38, such that the leg engagement member 40 may 'unscrew' to extend further from the leg support base 38, and may 'screw in' to retract into the leg support base 38. In yet another embodiment, the leg engagement member 40 may have a plurality of detents in its outer surface and the leg support base 38 may have a plunger or projection that is biased by a spring (e.g. a leaf spring) to engage whatever detent it is presented with. The driver may lift the projection to withdraw the projection from the detent it is engaged with against the biasing force of the spring to permit adjustment of the position of the leg engagement member 40 relative to the leg support base 38. Releasing the projection then permits it to reengage whatever detent it is facing. Alternatively any other suitable locking mechanism could be used.

Figure 4:
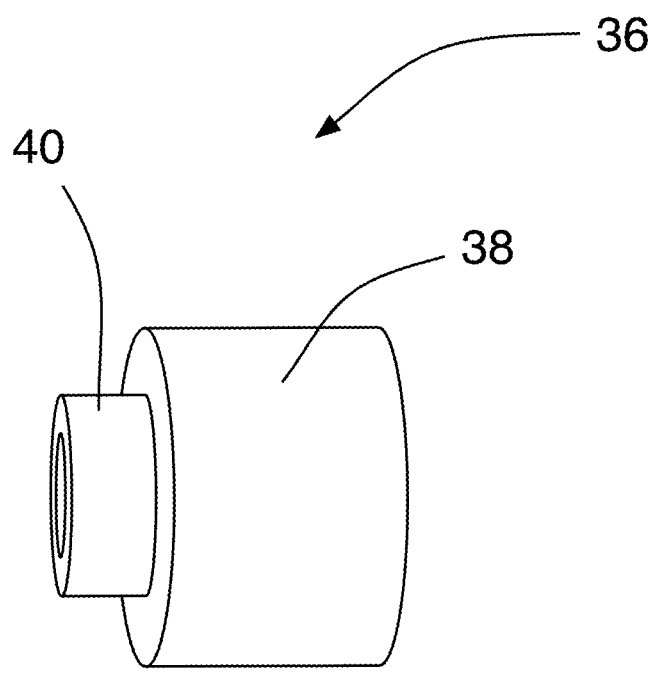
FIG. 4 is a magnified perspective view of the leg support.
Figure 5:
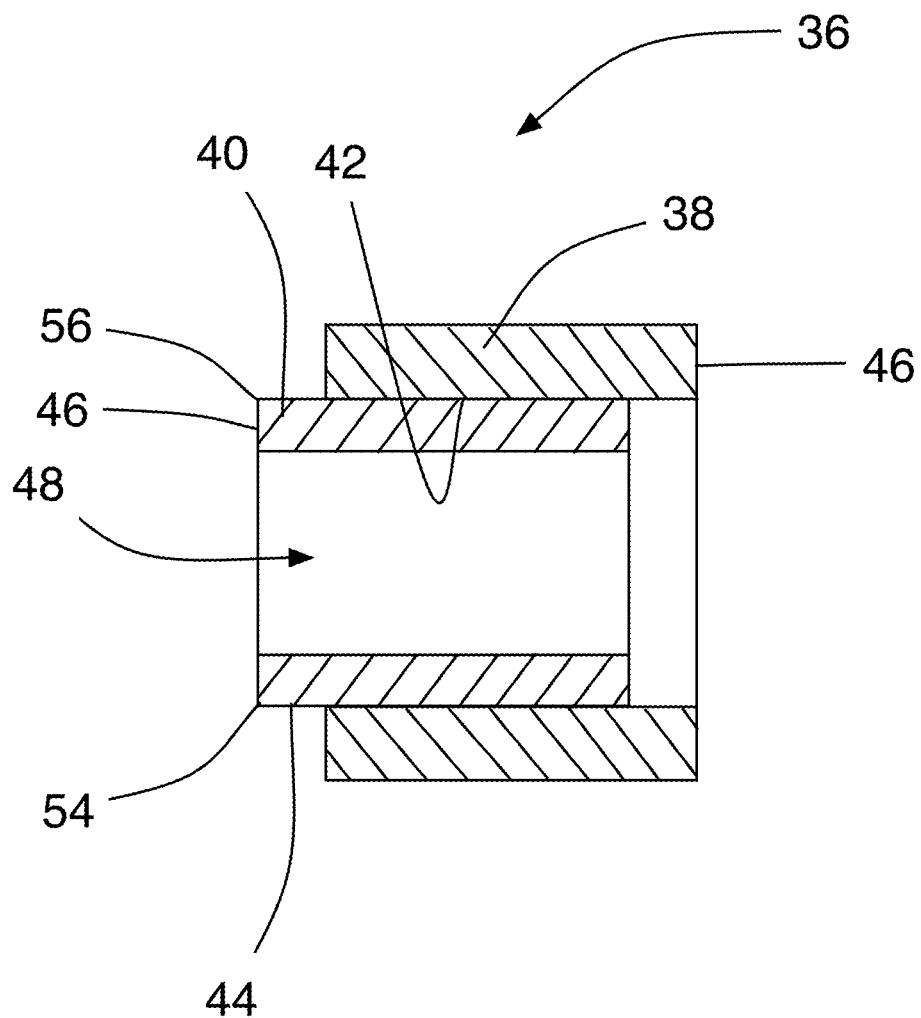
FIG. 5 is a sectional view of the leg support.

Referring to FIGS. 4 and 5, the leg engagement member 40 engages and supports the inboard leg 20a of the driver 16. The leg engagement member 40 may be made from a rigid, semi-rigid, or soft material. For example, the member 40 may be made from a suitable material such as an elastomeric material such as a closed cell foam material, or a gel-type material, such as is used in some modern mattresses.

Figure 7:
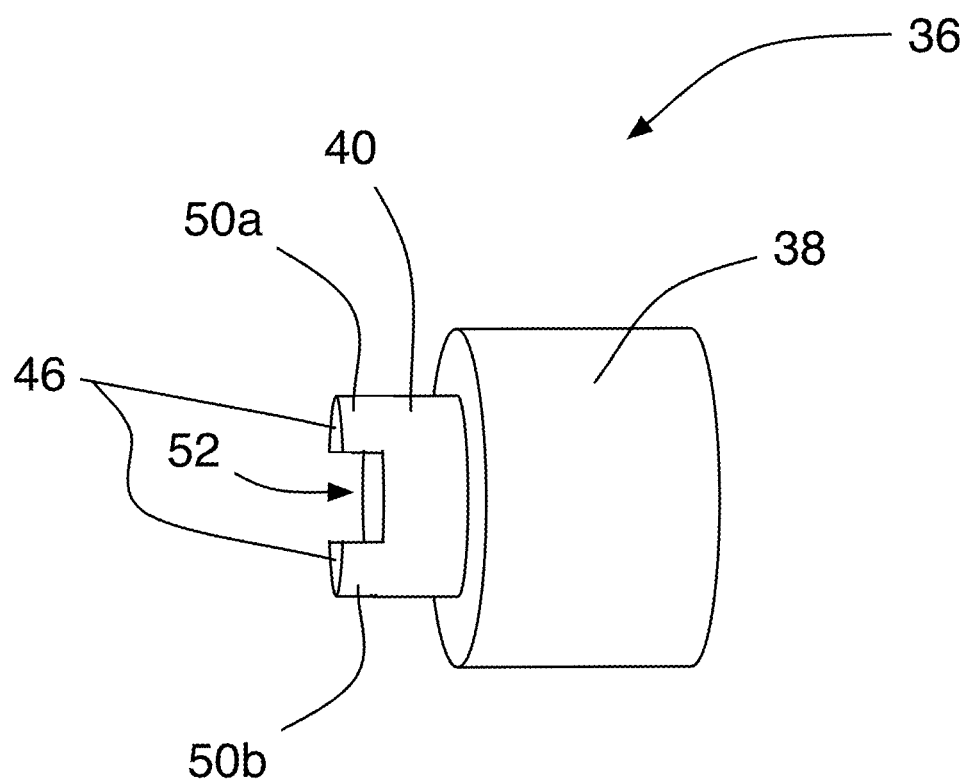
FIG. 7 is a perspective view of a variant of the leg support.

The leg engagement member 40 may have a leg engagement surface 46 that is a geometric shape surrounding an opening 48. By providing a geometric shape that is hollow (i.e. a shape that surrounds an opening), the leg engagement surface 46 engages a reduced amount of the driver's leg 20a while providing a relatively strong bracing effect on the leg 20a. It will be noted that the shape need not completely enclose the opening 48. For example, it is possible for the shape 46 to be formed by an upper engagement portion and a lower engagement portion that are spaced from one another by an opening 52, as shown at 50a and 50b in FIG. 7. In other embodiments, the leg engagement surface 46 need not be a hollow geometric shape but could instead be a shape with no opening therein. The leg engagement surface 46 has a lower edge 54 and an upper edge 56. In the embodiment shown in FIG. 4, the leg engagement surface 46 is generally annular.

Figure 6:
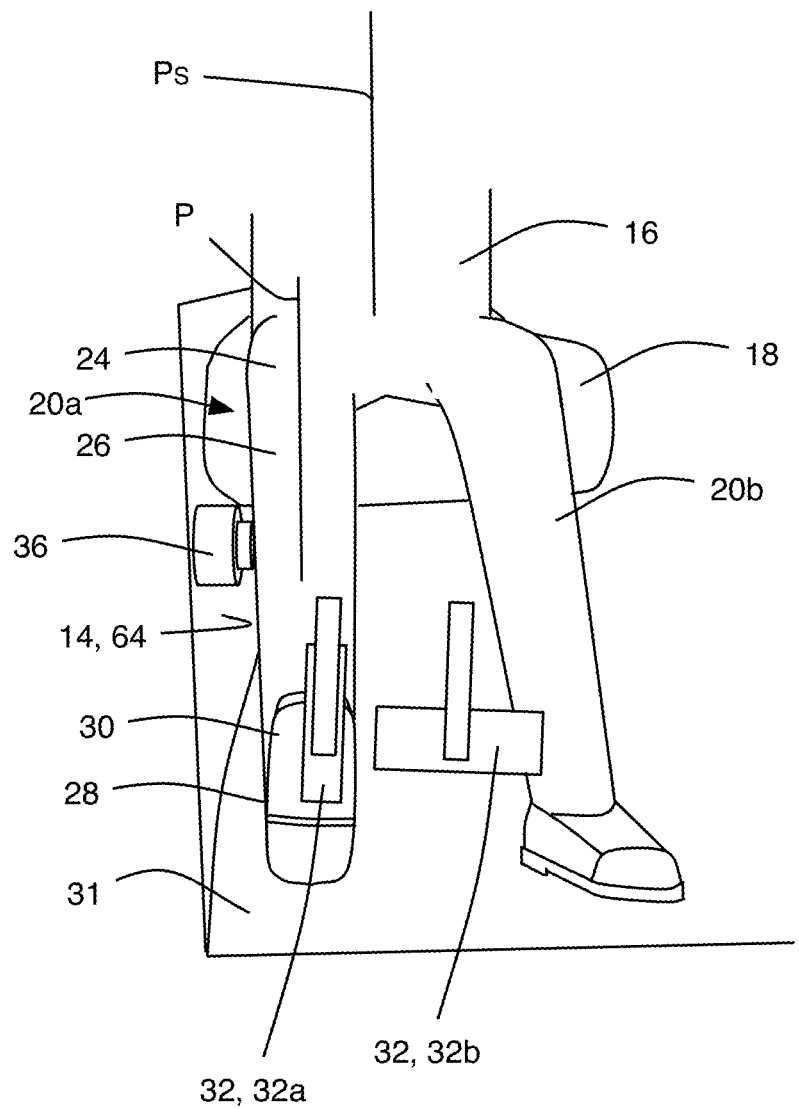
FIG. 6 is a front view of the leg support engaged with a lower leg of a driver.
Figure 6A:
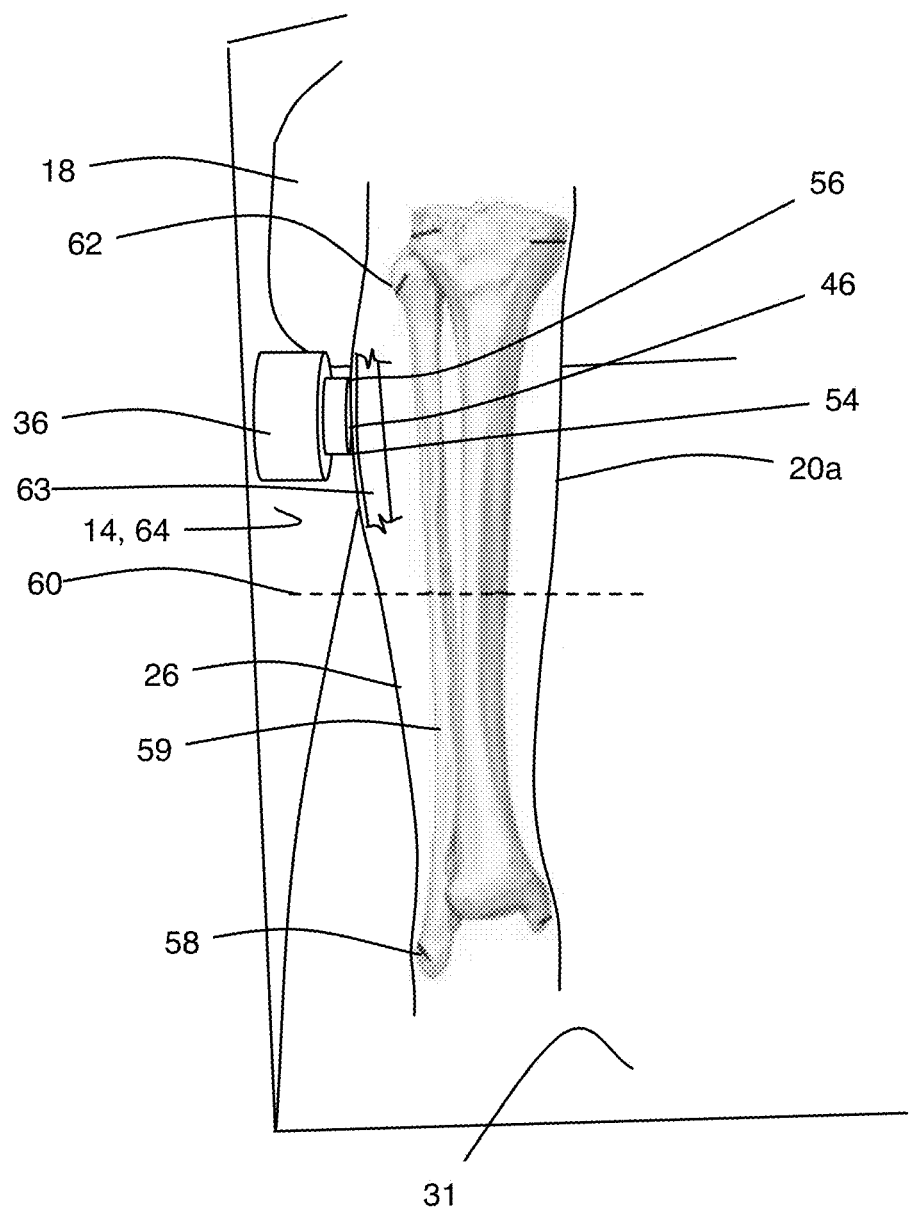
FIG. 6a is a magnified front view of the leg support engaged with the lower leg of the driver showing some of the anatomy of the lower leg.

With reference to FIG. 6a, the leg support 36 is positioned to engage a specific portion of the leg 20a of the driver 16. In particular, the leg support 36 is positioned to engage the laterally outer portion of the lower leg, such that the lower edge 54 of the leg engagement surface 46 is above the lateral malleolus (shown at 58) of the fibula (shown at 59) and the upper edge 56 of the leg engagement surface 46 is above a midpoint (i.e. a halfway point) shown at 60 of the fibula 59 and below the superior epiphysis 62. In another embodiment the upper edge 56 of the leg engagement surface 46 is positioned to engage the peroneus longus muscle 63 of the driver 16. In an embodiment the upper and lower edges 56 and 54 of the leg engagement surface are positioned to engage the peroneus longus muscle of the driver 16, a portion of which is shown in outline at 63, thereby inhibiting engagement with tendons, ligaments and bone.

An explanation of a basis for the above mentioned positional restrictions is provided as follows. The leg support 36, and in particular the upper edge 56 of the leg engagement surface 46 acts as a fulcrum about which a moment is exerted by the upper leg 22 as gravity urges the upper leg 22 and knee 24 to splay laterally outwardly towards the center console 14, as shown in FIG. 6. This moment is resisted in part by a moment exerted in the opposite direction about the fulcrum by frictional engagement between the foot 30 of the driver 16 and the vehicle floor 31, and in part by the driver 16 him/herself using his/her leg muscles to resist the urging by gravity. By positioning the upper edge 56 of the leg engagement surface 46 above the halfway point 60 the amount of force that needs to exerted by the leg muscles of the driver 16 to resist gravity and by the frictional engagement between the foot 30 and the vehicle floor 31 is reduced. By positioning the upper edge 56 of the leg engagement surface 46 below the superior epiphysis 62 and by positioning the lower edge 54 above the lateral malleolus 58, engagement between the leg engagement surface 46 is avoided against bone. By positioning the upper and lower edges 56 and 54 of the leg engagement surface 46 to engage the peroneus longus muscle 63, engagement of the leg engagement surface 46 is inhibited with tendons, ligaments and bone.

It will be noted that the leg engagement member 40 is positioned to engage the lateral face of the leg 20a and substantially avoids engagement with the posterior and anterior faces of the leg 20a. This provides the driver 16 with freedom of movement of the leg 20a fore and aft in the vehicle 10. By contrast, supporting the anterior face of the lower leg 26 of the driver 16 may be unduly restrictive on the freedom of movement of the driver 16. For example, in embodiments wherein the vehicle 10 is equipped with cruise control, the driver 16 may wish to move their leg aftwardly so as to rest their foot 30 on the vehicle floor 31 immediately aft of the accelerator and brake pedals 32a and 32b, while the cruise control maintains the speed of the vehicle 10. With a leg support that engages the posterior portion of the lower leg, the driver 16 would find it difficult to move their leg 20a sufficiently aftwardly to avoid contact with the accelerator and brake pedals 32a and 32b.

While the leg engagement member 40 has been shown to be extendable from the leg support base 38 it is optionally possible to provide a leg engagement member 40 that is non-extendable and is integral with the leg support base 38, thereby providing a non-adjustable embodiment of the leg support 36.

While the leg support base 38 has been shown to be adherable to the center console 14 it is alternatively possible for the leg support base 38 to connect to the center console by any other means, such as by being molded as part of the trim panel shown at 64 on the center console 14. In such an embodiment, the leg support 36 would be permanently connected to the center console 14.

In an example, the leg support 36 may be positioned so that the upper edge 56 of the leg engagement surface 46 is less than 13.5 inches above the vehicle floor 31, which represents the bottom of the superior epiphysis 58 in an example of a vehicle driver 16 who is about 70 inches tall and whose lower leg 26 is positioned so that the foot 30 can depress the accelerator pedal 32a. In this example, the upper edge 56 of the leg engagement surface 46 is more than about 10 inches above the vehicle floor 31 which represents the approximate midpoint 60 on the fibula 59 for the aforementioned example driver 16. The lower edge 54 of the leg engagement surface 46 is positioned more than about 4 inches above the vehicle floor 31 which represents the upper end of the lateral malleolus 62 for the aforementioned example driver 16.

Figure 8:
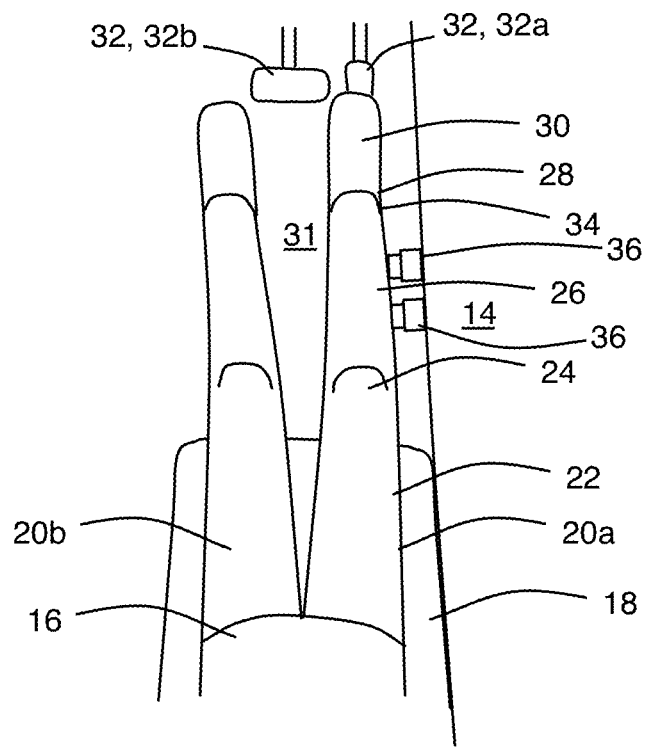
FIG. 8 is a plan view similar to FIG. 3, showing a plurality of leg supports supporting an inboard leg of the vehicle driver.

While a single leg support 36 has been shown supporting the driver's leg in FIGS. 3, 6 and 6a it will be understood that a plurality of such devices could be used. An example of the use of a plurality of such leg supports 36 is shown in FIG. 8. Where a plurality of such leg supports 36 are used, one or more of the leg supports 36 may be positioned with an upper edge 56 above the midpoint 60 of the driver's fibula 59 and below the superior epiphysis 62.

While the leg support 36 has been described for use by a driver of a vehicle, the leg support 36 may be usable by any occupant of a vehicle such as the front passenger.

While the leg support 36 has been described as being associated with the center console 14 of the vehicle 10 it is alternatively or additionally possible for the leg support 36 to be mounted to other components of the vehicle, such as the vehicle door, the dashboard, the seat or some other component.

Figure 9:
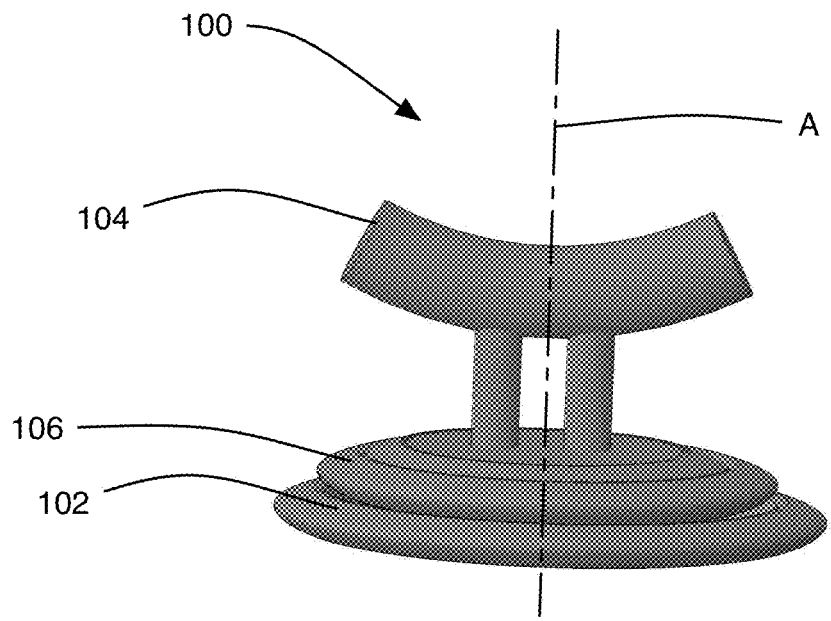
FIG. 9 is a perspective view of another embodiment of a leg support.

While the leg support 36 has been shown in FIG. 4 to be made up of two telescoping members 38 and 40, other configurations are possible. Referring to FIG. 9 a leg support member 100 is shown that includes a leg support base 102, a leg engagement member 104 and one or more intermediate members. In the embodiment shown in FIG. 9, one intermediate member 106 is shown. The member 106 may be extendable from the leg support base 102. Such extendability may be provided by any suitable means, such as by a friction fit mounting of the member 106 in the support base 102. The leg engagement member 104 may itself be extendable from the intermediate member 106 and may be mounted thereto via friction fit. With this mounting arrangement the engagement member 104 is adjustable in position relative to the base by virtue of the extendability of the intermediate member 106 from the support base 102 and further by the extendability of the engagement member 104 from the intermediate member 106.

Figure 13:
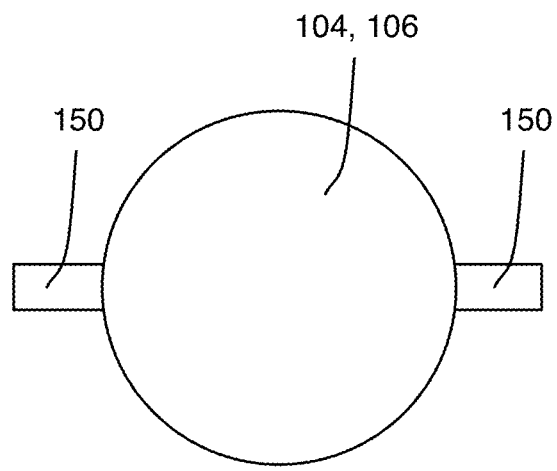
FIG. 13 is a top plan view of a component of the leg support shown in FIG. 10.
Figure 14:
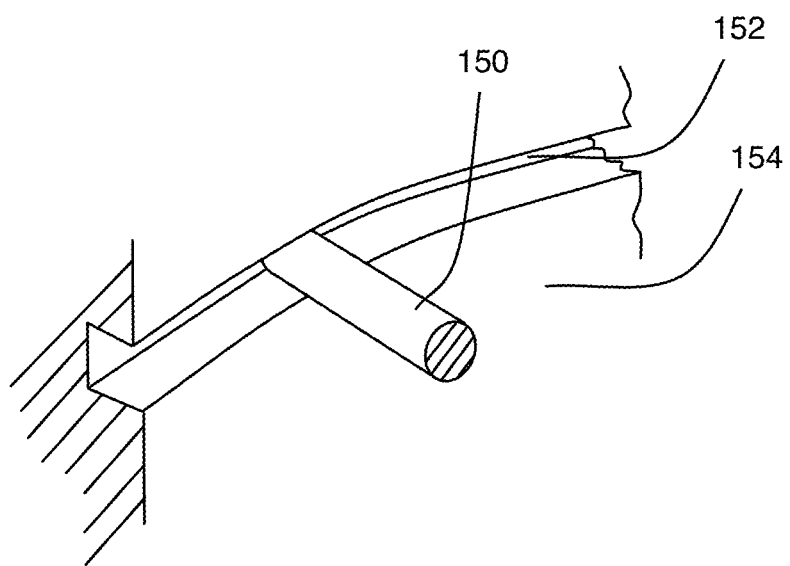
FIG. 14 is a perspective cutaway view of a portion of the leg support shown in FIG. 10.

As an alternative to a friction fit mounting other ways of mounting the elements 106 and 104 to the support base 102 may be used. For example, the intermediate member 106 may have arms 150 (see FIG. 13) that extend radially from its periphery. As shown in FIG. 14, these arms 150 may extend into a 'thread' 152 (i.e. a helical groove that snugly fits the arms 150) in the inner surface (shown at 154) of the support base 102, so that rotation of the intermediate member 106 about support base axis A permits the member 106 to extend or retract axially. The leg engagement member 104 may have a similar mounting to the intermediate member 106.

If the member 104 has two arms that are positioned diametrically opposite each other about the periphery of the member 104, and if the arms are generally cylindrical, the member 104 may be able to be tilted to cup or engage the leg at a selected angle. To facilitate this, the bottom of the member 104 may be generally shaped with an arcuate (i.e. part-spherical or part-cylindrical) shape so as to ensure that the bottom of the member 104 is not obstructed from tilting by the sides of the intermediate member 106. The arms need not be cylindrical however, and the member 104 need not be capable of being tilted. The arms, particularly if the engage the 'thread' with a large amount of surface area, would inhibit the member 104 from threading inwardly towards a retracted position as a result of the force applied to it from the driver's leg 20.

The leg engagement member 104 in FIG. 9 may have any suitable structure. In the embodiment shown in FIG. 9, the engagement member 104 may be made from a closed cell foam material that has a rigid internal skeleton therein.

Figure 10:
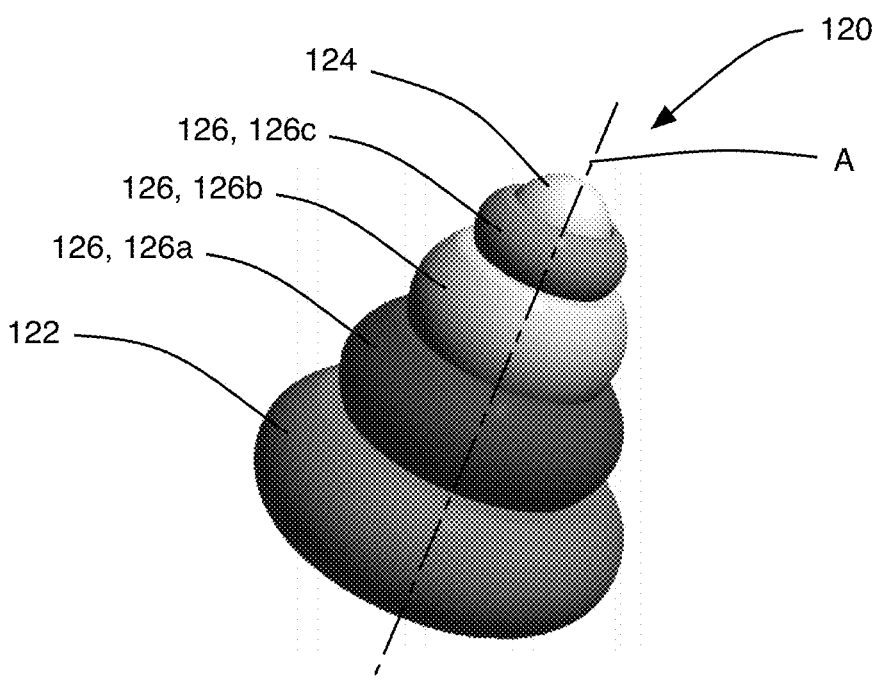
FIG. 10 is a perspective view of yet another embodiment of a leg support.

Another embodiment that incorporates a similar mounting arrangement between successive elements is shown at 120 in FIG. 10. The leg support 120 includes a leg support base 122, a leg engagement member 124, and three intermediate members 126 (shown individually at 126a, 126b and 126c). Each of the members 126 may mount to each other and to the support base 122 in a similar way described above in relation to the leg support 100. However, the leg engagement member 124 may be generally spherical and may be captured in the third intermediate member 126c above its great circle, thereby preventing it from escaping from the intermediate member 126c. However, the leg engagement member 124 may be sufficiently loosely captured that it can roll in place if a tangential force is applied to it. By permitting it to roll, if the vehicle occupant moves their leg 20 forwards or backwards while their leg 20 is engaged with the engagement member 124, the leg engagement member 124 can roll as necessary to accommodate the movement.

Figure 11:
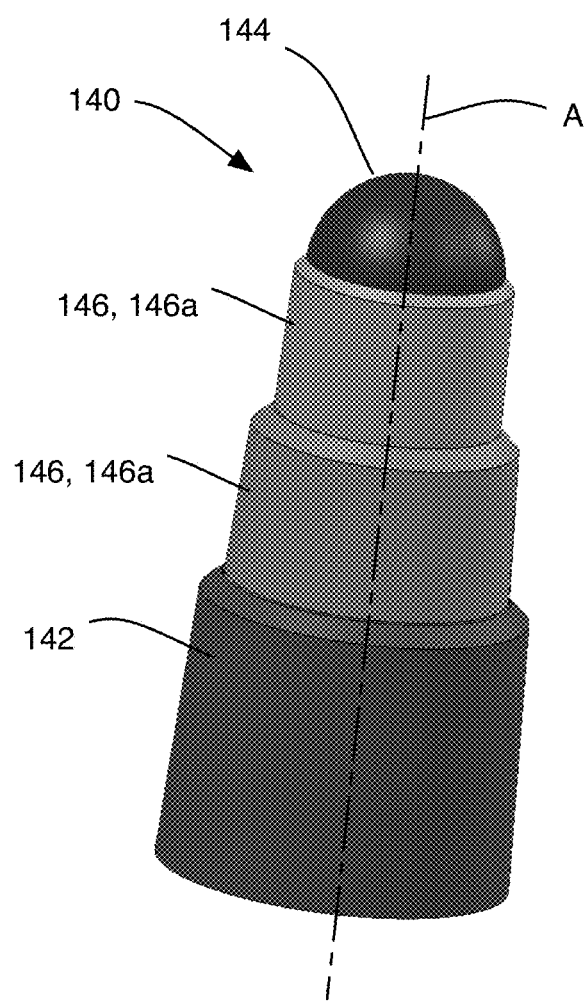
FIG. 11 is a perspective view of still another embodiment of a leg support.
Figure 12:
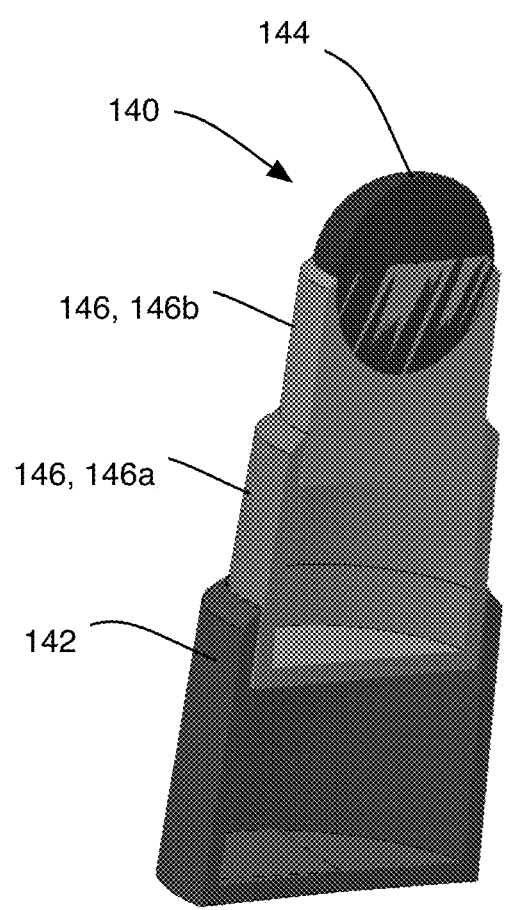
FIG. 12 is a sectional perspective view of the leg support shown in FIG. 11.

Another embodiment of the leg support is shown at 140 in FIGS. 11 and 12. The leg support 140 includes a leg support base 142, a leg engagement member 144, and two intermediate members 146 (shown individually at 146a and 146b). The intermediate members 146 may telescope outwards and may be held in position by any suitable means, such as by friction. Alternatively, the intermediate members may each include the aforementioned arms 150 which may engage an internal 'thread' or helical groove 152 on an inner surface 154 of the member 146b or on the leg support base 142. The leg engagement member 144 may be similar to the leg engagement member 124 shown in FIG. 10, and may be captured in the intermediate member 146b sufficiently loosely to permit it to roll when a tangential force is applied to it from the driver's leg 20.

While the above describes one or more particular embodiments, it will be appreciated that modifications and variations may be made to the embodiments described herein without departing from the proper scope of the claims appended hereto.

The invention claimed is:

1. A leg support for a vehicle occupant, comprising:
a leg support base mounted to a center console in a selected position relative to a vehicle seat in a vehicle; and
a leg engagement member that is adjustable in position relative to the leg support base,
wherein the leg engagement member has a leg engagement surface that extends generally parallel to a sagittal plane of a vehicle occupant in the vehicle seat so as to be positioned to engage the laterally outer face of a lower leg of the vehicle occupant, and wherein the leg engagement surface has a lower edge and an upper edge, and wherein the lower edge is positioned to engage the lower leg of the vehicle occupant above the lateral malleolus of the fibula of the vehicle occupant, and wherein the upper edge is positioned to engage the lower leg of the vehicle occupant above a midpoint of the fibula and below the superior epiphysis of the fibula, wherein the leg engagement member is positionable to support the lower leg of the vehicle occupant in such a way that the upper leg and the lower leg extend in a common plane that is substantially parallel to the sagittal plane of the vehicle occupant, wherein the leg engagement member is connected to the leg support base via at least one intermediate member, wherein the leg engagement member is extendable in a direction from the at least one intermediate member and wherein the at least one intermediate member is extendable in the direction from the leg support base.

2. A leg support as claimed in claim 1, wherein the leg support base has a generally cylindrical inner surface and the leg engagement member has a generally cylindrical outer surface and is telescopically extendable from the generally cylinder inner surface of the leg support base.

3. A leg support as claimed in claim 1, wherein the leg support base is removably adhered to the center console.

4. A leg support as claimed in claim 1, wherein the leg engagement member comprises a compressible member.

5. A leg support as claimed in claim 1, wherein the leg engagement surface that has an opening therein.

6. A leg support as claimed in claim 1, wherein the upper edge of the leg engagement surface is positioned to engage the peroneus longus muscle.

7. A leg support as claimed in claim 1, wherein the upper and lower edges of the leg engagement surface are positioned to engage the peroneus longus muscle.

8. A leg support as claimed in claim 1, wherein the at least one intermediate member is a plurality of intermediate members which are extendable from one another.

9. A leg support as claimed in claim 1, wherein the leg support base defines an axis and the leg engagement member is tiltable relative to the axis.

10. A leg support for a vehicle occupant, comprising:
a leg support base mounted to a center console in a selected position relative to a vehicle seat in a vehicle; and
a leg engagement member that is adjustable in position relative to the leg support base,
wherein the leg engagement member has a leg engagement surface that extends generally parallel to a sagittal plane of a vehicle occupant in the vehicle seat so as to be positioned to engage the laterally outer face of a lower leg of the vehicle occupant, and wherein the leg engagement surface has a lower edge and an upper edge, and wherein the lower edge is positioned to engage the lower leg of the vehicle occupant above the lateral malleolus of the fibula of the vehicle occupant, and wherein the upper edge is positioned to engage the lower leg of the vehicle occupant above a midpoint of the fibula and below the superior epiphysis of the fibula, wherein the leg engagement member is positionable to support the lower leg of the vehicle occupant in such a way that the upper leg and the lower leg extend in a common plane that is substantially parallel to the sagittal plane of the vehicle occupant,
wherein the leg engagement member is extendable relative to the leg support base via engagement of at least one leg with a helically extending groove.

11. A leg support as claimed in claim 10, wherein the at least one leg is on the leg engagement member.

12. A leg support as claimed in claim 11, wherein the at least one leg is a pair of legs that are diametrically opposed about the periphery of the leg engagement member.

13. A leg support as claimed in claim 12, wherein the pair of legs are generally cylindrical, thereby permitting the leg engagement member to tilt while the legs are engaged with the groove.

14. A leg support for a vehicle occupant, comprising:
a leg support base mounted to a center console in a selected position relative to a vehicle seat in a vehicle; and
a leg engagement member that is adjustable in position relative to the leg support base,
wherein the leg engagement member has a leg engagement surface that extends generally parallel to a sagittal plane of a vehicle occupant in the vehicle seat so as to be positioned to engage the laterally outer face of a lower leg of the vehicle occupant, and wherein the leg engagement surface has a lower edge and an upper edge, and wherein the lower edge is positioned to engage the lower leg of the vehicle occupant above the lateral malleolus of the fibula of the vehicle occupant, and wherein the upper edge is positioned to engage the lower leg of the vehicle occupant above a midpoint of the fibula and below the superior epiphysis of the fibula, wherein the leg engagement member is positionable to support the lower leg of the vehicle occupant in such a way that the upper leg and the lower leg extend in a common plane that is substantially parallel to the sagittal plane of the vehicle occupant,
wherein the leg engagement member is connected to the leg support base via at least one intermediate member,
wherein the leg engagement member is extendable from the at least one intermediate member and wherein the at least one intermediate member is extendable from the leg support base,
wherein the at least one intermediate member is a plurality of intermediate members which are extendable from one another.

15. A leg support as claimed in claim 14, wherein the leg support base has a generally cylindrical inner surface and the leg engagement member has a generally cylindrical outer surface and is telescopically extendable from the generally cylinder inner surface of the leg support base.

16. A leg support as claimed in claim 14, wherein the leg support base is removably adhered to the center console.

17. A leg support as claimed in claim 1, wherein the leg engagement member comprises a compressible member.

18. A leg support as claimed in claim 1, wherein the upper edge of the leg engagement surface is positioned to engage the peroneus longus muscle.

19. A leg support as claimed in claim 1, wherein the upper and lower edges of the leg engagement surface are positioned to engage the peroneus longus muscle.

20. A leg support as claimed in claim 1, wherein the leg support base defines an axis and the leg engagement member is tiltable relative to the axis.

* * * * *